United States Patent
Stadler (10) Patent No.: US 10,593,181 B2
(45) Date of Patent: Mar. 17, 2020

(54) SMOKE DETECTION DEVICE, METHOD FOR DETECTING SMOKE FROM A FIRE, AND COMPUTER PROGRAM

(71) Applicant: Robert Bosch GmbH, Stuttgart (DE)

(72) Inventor: Anton Stadler, Prien (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 16/097,972

(22) PCT Filed: Mar. 22, 2017

(86) PCT No.: PCT/EP2017/056757
§ 371 (c)(1),
(2) Date: Oct. 31, 2018

(87) PCT Pub. No.: WO2017/190881
PCT Pub. Date: Nov. 9, 2017

(65) Prior Publication Data
US 2019/0096211 A1    Mar. 28, 2019

(30) Foreign Application Priority Data
May 4, 2016    (DE) .................... 10 2016 207 705

(51) Int. Cl.
*G08B 17/12*    (2006.01)
*G06T 7/246*    (2017.01)
(Continued)

(52) U.S. Cl.
CPC .............. *G08B 17/125* (2013.01); *G01P 5/26* (2013.01); *G06K 9/00771* (2013.01);
(Continued)

(58) Field of Classification Search
CPC .............. G08B 17/125; G06T 7/248; G06T 2207/10016; G06T 2207/30232; G01P 5/26; G06K 9/00771
See application file for complete search history.

(56) References Cited

U.S. PATENT DOCUMENTS 4,896,532 A * 1/1990 Schmalz ............... G01M 9/067
                                                        250/356.1
5,127,264 A * 7/1992 Schmalz ............... G01M 9/067
                                                        73/147
(Continued)

FOREIGN PATENT DOCUMENTS

DE          19840873        3/2000
DE       102014219829        3/2016
(Continued)

OTHER PUBLICATIONS

International Search Report for Application No. PCT/EP2017/056757 dated Jun. 12, 2017 (English Translation, 3 pages).

*Primary Examiner* — Ojiako K Nwugo
(74) *Attorney, Agent, or Firm* — Michael Best & Friedrich LLP (57) ABSTRACT

The invention relates to a smoke detection device (1) for detecting smoke (7) from a fire (6) in a monitoring area (3), comprising a camera interface (8) for receiving an image sequence having chronologically successive individual images from a monitoring camera (2), wherein the individual images (4) show the monitoring area (3), and comprising an evaluating device (9) for detecting at least one moving object in the monitoring area (3), wherein the evaluating device (9) is designed to detect a motion of the at least one moving object from at least two individual images (4) of the image sequence (5), characterized by a filter
(Continued)

device (10) for distinguishing the moving object as smoke (7) or as a non-smoke object on the basis of the motion of the moving object.

12 Claims, 3 Drawing Sheets

(51) Int. Cl.
 *G01P 5/26* (2006.01)
 *G06K 9/00* (2006.01)
(52) U.S. Cl.
 CPC .... *G06T 7/248* (2017.01); *G06T 2207/10016* (2013.01); *G06T 2207/30232* (2013.01)

(56) References Cited

U.S. PATENT DOCUMENTS

| | | | | |
|---|---|---|---|---|
| 5,926,280 | A * | 7/1999 | Yamagishi | G08B 17/125 356/328 |
| 6,754,372 | B1 * | 6/2004 | Collobert | G06K 9/34 382/107 |
| 2006/0115154 | A1 * | 6/2006 | Chen | G08B 17/125 382/181 |
| 2009/0219389 | A1 * | 9/2009 | Marbach | G08B 17/125 348/143 |
| 2010/0073477 | A1 * | 3/2010 | Finn | G06K 9/0063 348/143 |
| 2010/0097474 | A1 * | 4/2010 | Zhao | G08B 17/125 348/169 |
| 2010/0134631 | A1 * | 6/2010 | Voth | G01N 15/1459 348/169 |
| 2011/0050894 | A1 * | 3/2011 | Jelinek | G08B 17/125 348/143 |
| 2012/0324990 | A1 * | 12/2012 | Briese | G01F 1/684 73/114.35 |
| 2013/0279803 | A1 | 10/2013 | Cetin | |
| 2017/0178344 | A1 * | 6/2017 | Kang | G06K 9/6212 |
| 2018/0308326 | A1 * | 10/2018 | Miwa | G08B 25/00 |

FOREIGN PATENT DOCUMENTS

| | | |
|---|---|---|
| WO | 0157819 | 8/2001 |
| WO | 2008037293 | 4/2008 |

* cited by examiner

SMOKE DETECTION DEVICE, METHOD FOR DETECTING SMOKE FROM A FIRE, AND COMPUTER PROGRAM

BACKGROUND OF THE INVENTION

The invention relates to a smoke detection device for detecting smoke from a fire in a monitoring area, having a camera interface for accepting an image sequence containing temporally successive individual images from a monitoring camera, wherein the individual images show the monitoring area, having an evaluation device for determining at least one moving object in the monitoring area, wherein the evaluation device is designed to determine a movement of the at least one moving object from at least two individual images in the image sequence. The invention also relates to a method for detecting smoke and to a computer program.

In addition to automated fire detectors which detect features of a fire using a temperature measurement, a scattered light measurement and other measurement methods and output an alarm on the basis thereof, a multiplicity of video-based fire detectors have become known in the meantime, which video-based fire detectors can detect and report a fire using meaningful fire features, for example optical emissions or smoke emissions, by means of image processing.

The document WO 2008/037 293 which probably forms the closest prior art proposes a method and a device for detecting smoke using a video camera. In the method, at least one video image of a video camera monitoring a region is recorded. At least one moving area of the at least one video image is then checked for the likely presence of smoke by determining the direction and the size of the moving area. In the event of a positive test result, at least one part of the at least one moving area is evaluated with regard to the presence of smoke on the basis of at least one item of information which is characteristic of smoke.

SUMMARY OF THE INVENTION

A smoke detection device and a method and a computer program are proposed within the scope of the invention. Preferred or advantageous embodiments of the invention emerge from the claims, the following description and the accompanying figures.

A smoke detection device for detecting smoke from a fire in a monitoring area is within the scope of the invention. The smoke is formed by smoke emissions, in particular combustion products of the fire. The monitoring area may be in the form of a closed monitoring area, for example a room and/or a hall. Alternatively and/or additionally, the monitoring area may also be an open monitoring area, for example an area of open land. Additionally, the smoke detection device is optionally designed to output a fire alarm when smoke is detected and is thus in the form of a fire detector, for example.

The smoke detection device has a camera interface which is designed to accept an image sequence containing at least two temporally successive individual images. The camera interface may be wired and/or wireless. In particular, the camera interface is in the form of a network interface.

The image sequence is provided by a camera. The smoke detection device optionally comprises the camera, wherein the camera is in the form of a CCD or CMOS camera, for example. The camera preferably records images in the visible range. Alternatively and/or additionally, the camera is designed to record images in the NIR, IR or UV range. The camera is, in particular, aimed at the monitoring area for the purpose of recording and providing the image sequence. The individual images from the camera preferably show an identical section of the monitoring area. The individual images in the image series are preferably spaced apart by a constant interval of time dt. The interval of time dt is preferably between 20 milliseconds and 300 milliseconds. For example, the camera is in the form of a camera having an image frequency of 25, 30, 50 or 60.

The smoke detection device comprises an evaluation device for determining at least one moving object in the monitoring area. The evaluation device is connected, in particular using data technology, to the camera interface in order to receive the individual images in the image sequence from said interface. The evaluation device is in the form of a computer, a microchip or a processor, for example.

The at least one moving object is, in particular, smoke or a non-smoke object. Moving non-smoke objects are preferably understood as meaning objects which are in the form of moving rigid bodies, for example conveyor belts, gates or slowly moving vehicles. The evaluation unit is designed to determine the movement of the at least one moving object from at least two individual images in the image sequence. A movement is preferably understood as meaning a change in a position of the object and/or a section of the object in a first individual image with respect to a second individual image, in which case the change in the position can be expressed in pixels and/or a unit of length, for example meters. The movement of the moving object is characterized in more detail, for example, by the speed of the change in the position of the object and/or a section of the object, which speed corresponds to a change in pixels per image pair and/or cm/image pair. Alternatively and/or additionally, the movement can be characterized, for example, as pixels/s and/or cm/s if there is a known time difference between the two individual images. The time difference between two individual images is preferably selected in such a manner that a difference of more than 0.5 pixels per image pair is achieved for smoke. In particular, as a movement of the object and/or a section of the object, the movement is directed in the upward direction and/or the averaged direction of movement is directed in the upward direction, in which case the upward direction is understood as meaning the direction from the ground to the horizon.

The smoke detection device comprises a filter device for distinguishing the moving object as smoke or a non-smoke object on the basis of the movement of the moving object. The filter device is preferably part of the evaluation device. Alternatively and/or additionally, the filter device may be in the form of a separate chip, computer or processor. In particular, the filter device is connected, using data technology, to the camera interface and/or evaluation device. The distinction as smoke and a non-smoke object, in particular a rigid body, is carried out, for example, on the basis of the evaluation of turbulence, speed and/or direction of movement of the moving object.

In this case, one consideration of the invention is that a particularly meaningful evaluation of smoke in a monitoring area is provided by using the filter device, in which case false alarms as a result of non-smoke objects being detected as smoke can be reduced. Since smoke usually has a different movement behavior and higher turbulence than non-smoke objects, a filter device can distinguish smoke and non-smoke objects on the basis of an analysis of the movement of objects in the monitoring area.

In one possible configuration of the invention, the evaluation device comprises a speed measuring unit for determining a speed $v_F$ of the average optical flow of the moving object and for determining a speed of a contour area of the moving object. Optical flow is understood as meaning, in particular, the change in grayscale values between two individual images in the image sequence on account of movement. The optical flow of an image pair $(G_k, G_{k+1})$ is preferably the vector field $$f_k(x,y)=(u_k(x,y);v_k(x,y))^T$$

with $G(x+u_k(x, y), y+v_k(x, y), t_k+\Delta t_{const})=G(x, y, t_k)$, where $G_k$ are grayscale values in the image at the time $t_k$, $u_k(x, y)$ is a shift vector in the horizontal direction and $v_k(x, y)$ is a shift vector in the vertical direction at the position having the coordinates (x, y).

The average optical flow is, in particular, the optical flow and/or resulting optical flow averaged over the entire moving object. The speed $v_F$ of the average flow of the moving object is, in particular, the vector field of the speed of points of the moving object which is projected into the image plane in the reference system of the imaging optics.

The contour area is preferably a selected area of the moving object in the image sequence. The contour area may be a two-dimensional section of the moving object, in which case the two-dimensional section preferably comprises an area of more than 4 pixels. Alternatively, the contour area may be a line element of the contour of the moving object, in which case the line element preferably comprises more than 2 pixels. In particular, the contour area may also be a punctiform section of the moving object. The speed $v_G$ of the contour area preferably forms the change in the position of the contour area from a first individual image to a second individual image for each image pair and/or for each time between the individual images in the image pair. The unit of the speed $v_F$ of the average optical flow and of the speed $v_G$ of the contour area is measured, in particular, in the change in pixels for each image pair and/or time, and the speeds are alternatively and/or additionally measured in cm/s.

In one particularly preferred configuration of the invention, the filter device comprises a comparison unit for detecting a moving object as smoke if the speed $v_G$ of the contour area is less than the speed $v_F$ of the average optical flow. The comparison unit is also designed to detect the moving object as a non-smoke object if the speed $v_F$ of the average optical flow is less than or equal to the speed $v_G$ of the contour area. The configuration is based on the consideration that smoke is continuously produced in a fire and a recorded observed area of smoke, in particular an area of smoke arranged close to the fire, does not change since smoke is always subsequently formed. In the case of a non-smoke object, for example a vehicle, the speed $v_G$ of a contour area is greater than the speed $v_F$ of the average optical flow.

In one possible configuration, the comparison unit comprises a first safety factor $b_1$ and a second safety factor $b_2$, in which case $0<b_1<=b_2<1$ applies to the safety factors. The comparison unit is preferably designed to detect at least one moving object as smoke if the speed $v_G$ of the contour area is less than the first safety factor $b_1$ times the speed $v_F$ of the average optical flow. In particular, the comparison unit is designed to detect a moving object as a non-smoke object if the speed $v_G$ of the contour area is greater than or equal to the speed $v_F$ of the average optical flow times the safety factor $b_2$. For $b_1 \neq b_2$, the comparison unit preferably detects an advance alarm stage if the speed $v_G$ of the contour area is greater than or equal to the speed $v_F$ of the average optical flow times the first safety factor $b_1$ and the speed $v_G$ of the contour area is less than the speed $v_F$ of the average optical flow times the second safety factor $b_2$.

The average optical flow of the moving object particularly preferably has an averaged flow direction. In particular, the averaged flow direction is the vector which results from adding all optical flow vectors of the moving object. In particular, the direction of the vector of the averaged flow direction corresponds to the direction of movement of the center of gravity of the moving object. The contour area is preferably arranged on that object side of the moving object which is contrary to the averaged flow direction. In particular, the contour area is part of the outline of the moving object. For example, the contour area for a fire with a wind direction from the left is that part of the smoke column rising obliquely to the right which is arranged at the bottom left.

In another possible configuration, the monitoring area comprises a base. The base may be, for example, the floor of a hall or a house to be monitored. In particular, the side opposite the base in the individual images forms the horizon, in which case the horizon may be the ceiling of the hall or room, for example. In one possible configuration, the contour area is arranged on that side of the moving object which is arranged close to the base. The configuration is based on the consideration that smoke rises from the base to the horizon and smoke is continuously subsequently produced at the base, with the result that the speed of a contour area close to the base is very low and/or zero. For such a moving object, the average optical flow would not be equal to zero since the smoke spreads upward. The speed $v_F$ of the average optical flow would therefore also be greater than the speed $v_G$ of the contour area.

In one particularly preferred configuration, the filter device comprises a turbulence analysis unit for distinguishing the moving object as smoke and a non-smoke object on the basis of turbulence in the moving object. Turbulence is understood as meaning, in particular, vortices which are shown, for example, as apparently temporally and spatially random variations in the individual images. The turbulence analysis unit is designed, in particular, to determine turbulence by comparing the moving object in at least two individual images in the image sequence. In particular, the turbulence analysis unit detects the moving object as smoke if turbulence is present and/or as a non-smoke object if there is no turbulence. The configuration is based on the consideration that smoke has a natural turbulence and the movement of rigid bodies has scarcely any turbulence to no turbulence, with the result that it is possible to distinguish between smoke and not smoke on the basis of the turbulence.

In another configuration of the invention, the evaluation device is designed to determine a first correspondence $R_1$ of the moving object as a degree of comparison and/or accordance of at least one first image area of the moving object in a first individual image and in a second individual image in the image sequence, wherein the first and second individual images were recorded with a temporal spacing dt. For example, a correspondence corresponds to finding a feature point and/or an image feature of a first image in a second image in the image sequence again. In this configuration, the evaluation device is also designed to determine at least a second correspondence $R_2$ as a degree of comparison and/or accordance of the at least first image area in the first individual image and in a third individual image in the image sequence, wherein the first individual image and the third individual image were recorded with a temporal spacing of n*dt, where n is a positive number. Preferably, n is a number between two and five.

The evaluation device is preferably designed to compare the image area of the moving object in the first individual image with the image area of the moving object in the second individual image, wherein the evaluation device compares each section of the image area in the two images and assesses it as accordance $r_1$ as follows:

$$r_1 = \begin{cases} 1, \text{ accordance for } dt \\ 0, \text{ no accordance for } dt \end{cases}$$

The correspondence $R_1$ is determined, in particular, as the accordance within the entire region of interest as follows, wherein the entire moving object forms the region of interest, for example:

$$R_1 = \sum_{y,x \in ROI} r_1(x, y)$$

The evaluation device is preferably also designed to determine an accordance $r_2$ in the first and third images in a similar manner to $r_1$ as follows:

$$r_2 = \begin{cases} 1, \text{ accordance for } n*dT \\ 0, \text{ no accordance for } n*dT \end{cases}$$

The second correspondence $R_2$ is determined, in particular, as:

$$R_2 = \sum_{y,x \in ROI} r_2(x, y)$$

In one possible configuration, the turbulence analysis unit comprises two factors $c_1$ and $c_2$, where $0<c_1<=c_2<1$. The turbulence analysis unit is designed, in particular, to detect a moving object as smoke if $R_2<c_1*R_1$ and/or to detect a moving object as a non-smoke object if $R_2>c_2*R_1$. The turbulence analysis unit may be designed to assess the moving object as an advance alarm if $c_1*R_1 \geq R_2 < c_2*R_1$.

In one particularly preferred configuration of the invention, the evaluation device is designed to normalize the first correspondence $R_1$ and the second correspondence $R_2$ with a region of interest to relative correspondences $\tilde{R}_1$ and $\tilde{R}_2$. The region of interest is, for example, the entire image area of the moving object or an arbitrarily stipulated area in the individual images. The region of interest has an area which can be measured in pixels, for example, and has the size size(ROI). The normalization is preferably carried out as follows:

$$\tilde{R}_1 = \frac{R_1}{size(ROI)}$$

$$\tilde{R}_2 = \frac{R_2}{size(ROI)}$$

In this configuration, the turbulence analysis unit comprises two safety factors $d_1$ and $d_2$, where $0<d_1<=d_2<1$. The turbulence analysis unit is designed, in particular, to detect a moving object as smoke if $\tilde{R}_2 \leq d_1*\tilde{R}_1$ and/or to detect a moving object as a non-smoke object if $\tilde{R}_2 \geq d_1*\tilde{R}_1$. The range $d_1*\tilde{R}R_1 \leq \tilde{R}_2 < d_2\tilde{R}_1$ is preferably classified by the turbulence analysis unit as an advance alarm. In particular, $d_1=d_2=d$ may be selected, in which case d is, for example, greater than 0.4 and less than 0.6.

A further aspect of the invention relates to a method using a smoke detection device for detecting smoke in a monitoring area, wherein an evaluation device determines the movement of a moving object in a monitoring area on the basis of at least two individual images in an image series of the monitoring area, and a filter device determines the moving object as smoke and a non-smoke object on the basis of the movement of the moving object.

The invention also relates to a computer program having program code means for carrying out the method described above, preferably on a smoke detection device or on a data processing system.

BRIEF DESCRIPTION OF THE DRAWINGS

Further features, advantages and effects of the invention emerge from the following description of a preferred exemplary embodiment of the invention and the accompanying figures, in which.

DETAILED DESCRIPTION

Figure 1:
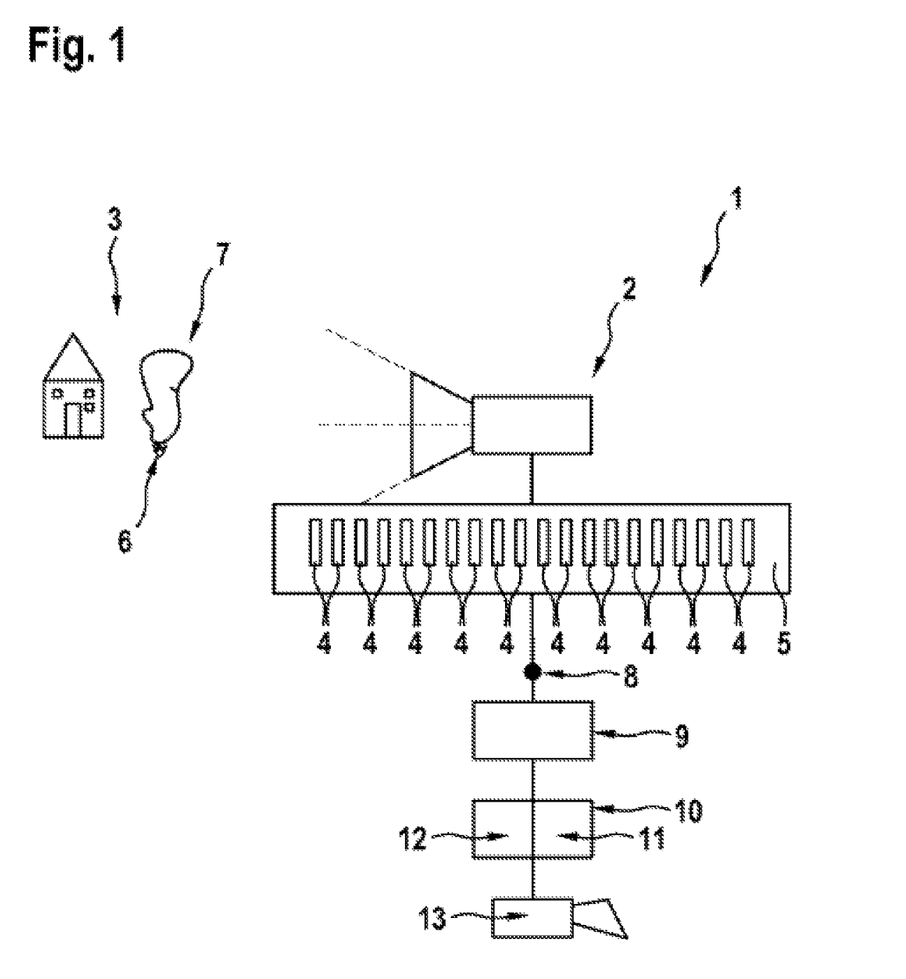
FIG. 1 shows a schematic block diagram of a smoke detection device as an exemplary embodiment of the invention.

FIG. 1 illustrates a highly schematic illustration of a smoke detection device 1 as a first exemplary embodiment of the invention. The smoke detection device 1 optionally comprises a monitoring camera 2. The monitoring camera 2 may be in the form of a color camera and/or a black-and-white camera. The monitoring camera 2 is designed to record a plurality of individual images 4 of a monitoring area 3, the plurality of individual images 4 forming an image sequence 5. In this exemplary embodiment, the monitoring area 3 has a house and a fire 6 and the smoke 7 produced by the latter. The individual images 4 in the image sequence 5 show the monitoring area 3 and were recorded with a temporal spacing dt.

The smoke detection device 1 comprises a camera interface 8, wherein the camera interface 8 is connected to the monitoring camera 2 using data technology. The monitoring camera 2 is designed to provide the smoke detection device 1 with the individual images 4 in the image sequence 5 as digital data via the camera interface 8.

The smoke detection device 1 comprises an evaluation device 9. In this exemplary embodiment, the evaluation device 9 is in the form of an embedded computer. In particular, the evaluation device is in the form of an image evaluation unit and may comprise a frame grabber. The evaluation device 9 determines whether a moving object is situated in the monitoring area 3 by comparing at least two individual images 4 in the image sequence 5. For example, the evaluation unit 9 compares whether the position of an object in a first individual image 4 in the image sequence has changed in a second individual image 4 in the image sequence 5.

The evaluation device 9 is also designed to determine the movement of an object moving in the monitoring area 3 more precisely. For example, the more precise determination of the movement of the moving object comprises the determination of the absolute value and the direction of the speed of the moving object and the determination of the average optical flow 16 (FIGS. 2a and 2b) of the moving object and the speed $v_F$ of the average optical flow 16.

The smoke detection device 1 comprises a filter device 10 for distinguishing whether the moving object is smoke 7 or a moving non-smoke object 14 (FIGS. 2a and 2b), for example a moving roller door or person, on the basis of the movement of the moving object. The filter device 10 is part of the evaluation device 9 here, but may alternatively be in the form of a separate computer or chip. In this exemplary embodiment, the filter device 10 distinguishes the moving object as smoke 7 or as a moving non-smoke object 14 in two ways. For this purpose, the filter device 10 comprises a comparison unit 11 and a turbulence analysis unit 12.

The comparison unit 11 is designed to distinguish a moving object as smoke 7 or as a moving non-smoke object 14 by comparing the speed $v_G$, in particular the absolute value of the speed, of a contour area 17 (FIGS. 2a and 2b) with the speed $v_F$ of the average optical flow 16. In this exemplary embodiment, the resulting speed of the moving object is considered to be the speed $v_F$ of the average optical flow 16. Alternatively and/or additionally, the speed of the center of gravity of the moving object is considered to be the speed $v_F$ of the average optical flow 16. Any desired section of the moving object can be used as the contour area 17, wherein the contour area 17 is arranged on the lower region of the moving object in this example. The speed $v_G$ of the contour area 17 corresponds to the change in position of the contour area 17 from a first individual image 4 to a second individual image 4. Their speed absolute values are considered below as the speed $v_F$ of the average optical flow 16 and/or the speed $v_G$ of the contour area 17. For example, the speeds are determined as the change in the position in pixels and/or centimeters per unit of time or for each image pair.

The comparison unit 11 comprises two safety factors $b_1$ and $b_2$ which are used to compare the speeds of the contour area 17 and of the average optical flow 16. The safety factors make it possible to more reliably detect smoke 7 in the monitoring area 3 and to reduce false alarms as a result of moving non-smoke objects 14 being detected as smoke 7. The comparison unit 11 classifies a moving object as smoke 7 if the speed $v_G$ of the contour area 17 is less than the product of the safety factor $b_1$ and the speed $v_F$ of the average optical flow 16. A moving object is detected by the comparison unit 11 as a moving non-smoke object 14 if the speed $v_G$ of the contour area 17 is greater than or equal to the product of the safety factor $b_2$ and the speed $v_F$ of the average optical flow.

The comparison unit 11 uses the effect that a fire 6 continuously produces smoke 7, with the result that no optical change can be detected in the section of smoke close to the fire 6 since smoke 7 is continuously subsequently provided there. A speed which is measured in this area as a change in the first individual image with respect to the second individual image is therefore very low and/or zero for smoke. In the case of moving non-smoke objects 14 which are formed in particular by rigid bodies, all edges and contours uniformly move at the same speed, precisely the speed of the center of gravity, and so also the contour area 17 has a speed of greater than zero.

The turbulence analysis unit 12 uses the effect that smoke 7 has a high natural turbulence, with the result that the features inside smoke 7 change from individual image 4 to individual image 4 as moving objects. In order to determine the turbulence of a moving object in the monitoring area, the evaluation device is designed to determine a first correspondence $R_1$ and a second correspondence $R_2$ of the object moving in the monitoring area 3. For this purpose, the evaluation device 9 compares at least one image area of the moving object in a first individual image 4 with the corresponding image area in a second individual image 4. For this purpose, the evaluation device 9 is able, for example, to extrapolate the image area of the moving object in the first individual image 4 to the second individual image 4 with the aid of the speed $v_F$ of the average optical flow 16 and to therefore determine the position of the corresponding image area in the second and/or third individual image, with the result that it is possible to compare the image areas in the first and second individual images 4. The image area in the individual images 4 is preferably compared pixel-by-pixel, wherein the evaluation device 9 classifies an image area found again in the second individual image 4 as an accordance $r_1=1$ and classifies no accordance as $r_1=0$. The actual correspondence $R_1$ is determined by the evaluation device 9 as the sum of all accordances $r_1$ of the first and second individual images 4.

The evaluation device 9 is additionally designed to determine the second correspondence $R_2$ of the moving object. For this purpose, the evaluation device 9 compares the at least one image area in the first individual image 4 with the corresponding image area in a third individual image 4. The third individual image 4 is recorded with a temporal spacing of 4*dt with respect to the first individual image 4. Alternatively, the temporal spacing between the first individual image 4 and the third individual image 4 may be arbitrarily selected, in which case it should be ensured that natural changes in the monitoring area 3 can also be detected as a moving object in the case of an excessively long temporal spacing. In contrast, for a temporal spacing which is selected to be excessively short, the change may be too small, with the result that it cannot be detected as a movement.

The turbulence analysis unit 12 comprises two factors $c_1$ and $c_2$ which are both greater than zero and less than one. In this exemplary embodiment, $c_1=c_2=0.5$, in particular. The turbulence analysis unit 12 is designed to compare the correspondence $R_1$ with the correspondence $R_2$. A moving object is detected by the turbulence analysis unit 12 as smoke 7 if the correspondence $R_2$ is less than the product of the safety factor $c_1$ and the correspondence $R_1$. A moving object is detected by the turbulence analysis unit 12 as a moving non-smoke object 14 if the product of the safety factor $c_2$ and the correspondence $R_1$ is less than or equal to the correspondence $R_1$. This distinction as smoke 7 and a non-smoke object 14 uses the fact that the correspondences $R_1$ and $R_2$ are approximately the same in the case of a moving non-smoke object 14, whereas $R_2$ is usually less than $0.6*R_1$ in the case of smoke 7.

In this exemplary embodiment, the smoke detection device 1 has an alarm unit 13 which is in the form of a horn here. The horn is activated by the filter device 11 if both the turbulence analysis unit 12 and the comparison unit 11 detect the moving as smoke 7 or neither of the two detects the moving object as a moving non-smoke object 14.

Figure 2A:
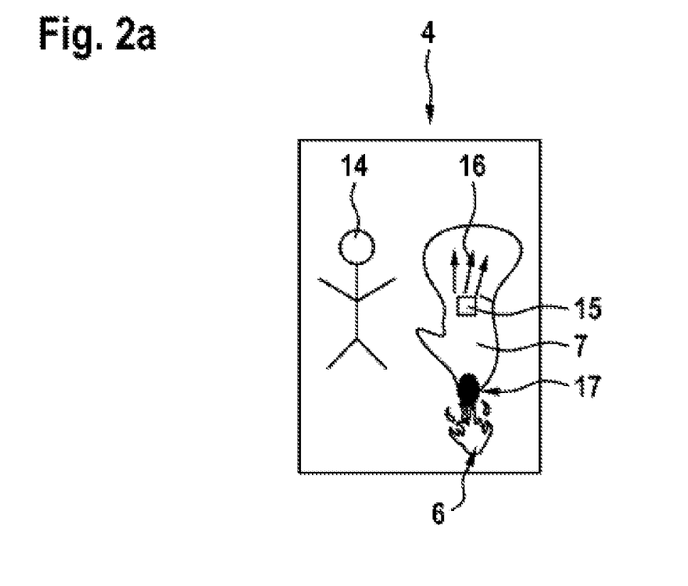
FIG. 2a and FIG. 2b each show an illustration of an individual image of a monitoring area.
Figure 2B:
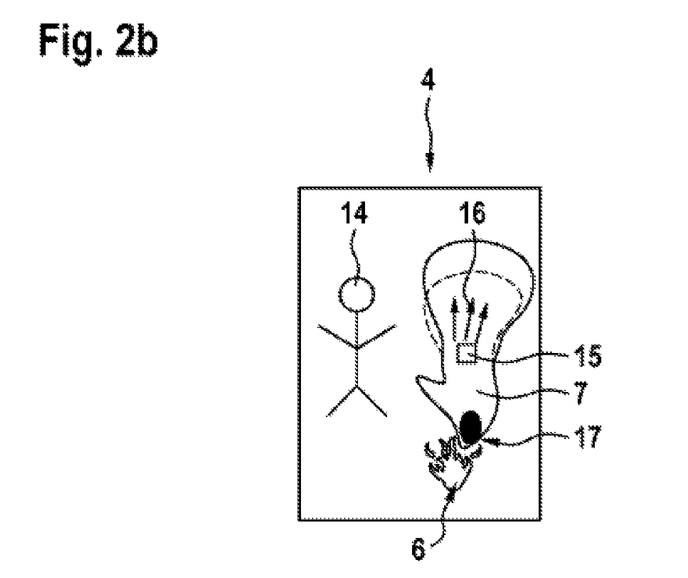

FIGS. 2a and 2b show two exemplary individual images 4 which were recorded with a temporal spacing dt. Each of the individual images 4 shows, for example, a person as a moving non-smoke object 14 and a fire 6 with smoke 7. In both images, a section inside the smoke 7 is respectively selected as a smoke section 15, for example, and is provided with the vectors of the optical flow 16 of this smoke section. The vectors of the optical flow 16 indicate the direction in which and how quickly a selected will change from individual image to individual image.

FIG. 2b additionally depicts, in the individual image 4 in the smoke 7, the area of the smoke 7 in the preceding individual image 4 in the image sequence 5 as a dashed line. As is recognizable by comparing the two individual images from FIGS. 2a and 2b, that section of the smoke 7 which is in the lower area of the individual image 4 scarcely changes and/or does not change, whereas that section of the smoke 7 which is in the upper area of the individual image 4 continues to move and therefore changes. The evaluation device 9 can determine the speed of the continued movement of the smoke by comparing the continued movement of the smoke 7 in the upper area of the individual image 4, which speed is used in this exemplary embodiment as the speed $v_F$ of the average optical flow 16.

The turbulence analysis unit 12 compares, for example, the chosen smoke area 15 from FIG. 2a with the chosen smoke area 15 from FIG. 2b. On account of the natural intrinsic turbulence of smoke 7, the distribution of the grayscale values and/or color values in this area will have changed from the first individual image 4 to the second individual image 4, which results in a lower accordance and a low correspondence than in the case of a rigid body.

A contour area 17 has been selected in the lower area of the smoke 7. The contour area 17 is a two-dimensional area comprising more than 5 pixels and fewer than 500 pixels at the edge of the smoke 7. Comparing the accordance of the depicted contour area 17 in the first and second individual images would result in a higher accordance than a possible contour area 17 in the upper area of the smoke 7. The sum of the accordance of the overall moving object from the first individual image 4 to a further individual image 4 is used as a degree of accordance of the moving object from the first individual image 4 to the further individual image 4. By comparing the correspondence from the first to the second individual image 4 with the correspondence from the first to a third individual image 4, the turbulence analysis unit 12 can distinguish smoke 7 from a moving non-smoke object 14 and can thus possibly report a fire in the monitoring area 3.

Figure 3A:
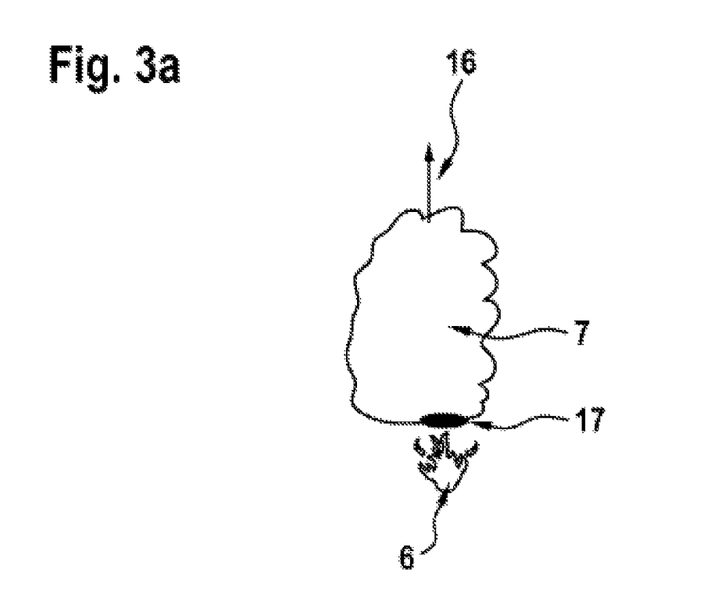
FIG. 3a and FIG. 3b show an illustration of a fire with smoke.
Figure 3B:
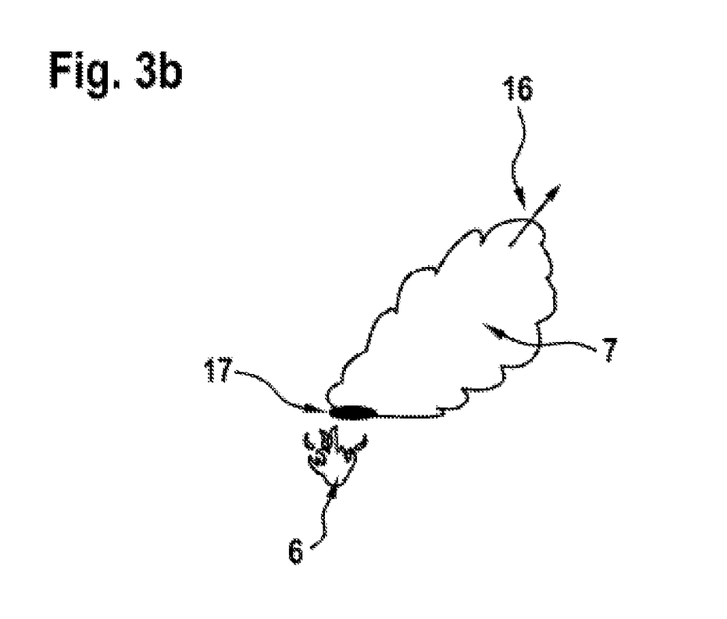

FIGS. 3a and 3b each show a fire 6 with smoke 7 above it, in which case a contour area 17 in the smoke 7 is selected in both cases. FIG. 3a shows a fire 6 in a windless monitoring area 3, for example a factory hall, where the smoke 7 rises in a vertical direction. The vertical rising of the smoke 7 results in a speed of the average optical flow 16 in the vertical direction. In FIG. 3a, the contour area 17 is arranged in the lower area of the smoke 7. This arrangement of the contour area 17 in the lower area likewise corresponds to an arrangement of the contour area 17 on that side of the smoke 7 which is opposite the averaged flow direction.

In this case, the evaluation device 9 determines a speed of the average optical flow 16 in the vertical direction. The evaluation device 9 a speed of zero for the selected contour area 17 at the bottom since smoke 7 is continuously subsequently produced and no optical variations can therefore be detected.

FIG. 3b shows a fire 6 with smoke development in a monitoring area 3 with wind from the left, with the result that the smoke 7 rises up to the right. The speed of the average optical flow 16 of the moving object has an upward vertical component and a horizontal component to the right. In this exemplary embodiment, as in 2a, the contour area 17 is arranged on that side of the moving object which is contrary to the averaged optical flow direction of the moving object. In this example too, the evaluation device 9 would determine a speed $v_F$ of the average optical flow 16 which is not equal to zero and would detect a speed $v_G$ of the contour area 17 of zero or approximately zero. In this case, the comparison unit 11 will be able to distinguish the moving object as smoke 7 or as a moving non-smoke object 14 on the basis of a comparison of the speed $v_F$ of the average optical flow 16 and the speed $v_G$ of the contour area 17.

The invention claimed is:

1. A smoke detection device (1) for detecting smoke (7) from a fire (6) in a monitoring area (3), the smoke detection device comprising:
   a camera interface (8) for accepting an image sequence having temporally successive individual images from a monitoring camera (2), wherein the individual images (4) show the monitoring area (3),
   an evaluation device (9) for determining at least one moving object in the monitoring area (3), wherein the evaluation device (9) is designed to determine a movement of the at least one moving object from at least two individual images (4) in the image sequence (5), and
   a filter device (10) for distinguishing the moving object as smoke (7) or a non-smoke object on the basis of the movement of the moving object,
   wherein the evaluation device (9) comprises a speed measuring unit for determining a speed $v_F$ of the average optical flow (16) of the moving object and for determining a speed $v_G$ of a contour area (17) of the moving object.

2. The smoke detection device (1) as claimed in claim 1, wherein the filter device (10) comprises a comparison unit (11), wherein the comparison unit (11) is designed to (a) detect the moving object as smoke (7) if $v_G<v_F$, (b) to detect the moving object as a non-smoke object if $v_G>=v_F$, or both (a) and (b).

3. The smoke detection device (1) as claimed in claim 1, wherein the filter device (10) comprises a comparison unit (11) having two safety factors $b_1$ and $b_2$ with $0<b_1<=b_2<1$, wherein the comparison unit (10) is designed to (a) detect the moving object as smoke (7) if $v_G<b_1*v_F$, (b) to detect the moving object as a non-smoke object if $v_G>=b_2*v_F$, or both (a) and (b).

4. The smoke detection device (1) as claimed in claim 1, wherein the average optical flow (16) of the moving object has an averaged flow direction, and wherein the contour area (18) is arranged on that side of the moving object which is contrary to the averaged flow direction.

5. The smoke detection device (1) as claimed in claim 1, wherein the monitoring area (3) comprises a base, wherein the contour area (17) is arranged on that side of the moving object which faces the base.

6. A The smoke detection device (1) for detecting smoke (7) from a fire (6) in a monitoring area (3), the smoke detection device comprising:
   a camera interface (8) for accepting an image sequence having temporally successive individual images from a monitoring camera (2), wherein the individual images (4) show the monitoring area (3),
   an evaluation device (9) for determining at least one moving object in the monitoring area (3), wherein the evaluation device (9) is designed to determine a movement of the at least one moving object from at least two individual images (4) in the image sequence (5), and a filter device (10) for distinguishing the moving object as smoke (7) or a non-smoke object on the basis of the movement of the moving object, wherein the filter device (10) comprises a turbulence analysis unit (12) for distinguishing the moving object as smoke (7) and a non-smoke object on the basis of turbulence in the moving object.

7. The smoke detection device (1) as claimed in claim 6, wherein the evaluation device (9) is designed to determine a first correspondence $R_1$ of the moving object as a degree of comparison of at least one first image area in a first individual image and in a second individual image (4), wherein the two individual images (4) have a temporal spacing dt, and the evaluation device (9) is designed to determine at least a second correspondence $R_2$ of the moving object as a degree of comparison of the first image area in the first individual image and in a third individual image (4), wherein the first individual image (4) and the third individual image (4) have a temporal spacing of n*dt, wherein the turbulence analysis unit (12) comprises two factors $c_1$ and $c_2$ with $0<c_1<=c_2<1$ and is designed to detect the moving object as smoke (7) if $R_2<c_1*R_1$ and to detect the moving object as a non-smoke object if $R_2>=c_2*R_1$.

8. The smoke detection device (1) as claimed in claim 7, wherein the evaluation device (9) is designed to normalize the first correspondence $R_1$ and the second correspondence $R_2$ with a region of interest (ROI) to a relative first correspondence $\tilde{R}_1$ and a relative second correspondence $\tilde{R}_2$, and the turbulence analysis unit (12) comprises two factors $d_1$ and $d_2$ with $0<d_1<=d_2<1$ and is designed to detect the moving object as smoke (7) if $\tilde{R}_2<d_1*\tilde{R}_1$ and to detect the moving object as a non-smoke object if $\tilde{R}_2>d_2*\tilde{R}_1$.

9. A method using a smoke detection device (1) according to the invention as claimed in claim 1, wherein the evaluation device (9) determines the movement of the moving object in the monitoring area (3) on the basis of at least two individual images (4) in an image series of the monitoring area (3), and the filter device (10) determines the moving object as smoke (7) and a non-smoke object on the basis of the movement of the moving object.

10. A non-transitory computer readable media comprising program code for carrying out all steps of the method as claimed in claim 9 when the program is executed by the smoke detection device.

11. The smoke detection device (1) as claimed in claim 1, the smoke detection device including a non-transitory computer readable media comprising program code.

12. A smoke detection device (1) for detecting smoke (7) from a fire (6) in a monitoring area (3), the smoke detection device comprising:

a camera interface (8) for accepting an image sequence having temporally successive individual images from a monitoring camera (2), wherein the individual images (4) show the monitoring area (3), an evaluation device (9) for determining at least one moving object in the monitoring area (3), wherein the evaluation device (9) is designed to determine a movement of the at least one moving object from at least two individual images (4) in the image sequence (5), and a filter device (10) for distinguishing the moving object as smoke (7) or a non-smoke object on the basis of the movement of the moving object, wherein the filter device (10) comprises a turbulence analysis unit (12) for distinguishing the moving object as smoke (7) and a non-smoke object on the basis of turbulence in the moving object, and wherein the turbulence is vortices which are shown as temporally and spatially random variations in the individual images.

* * * * *